UNITED STATES PATENT OFFICE.

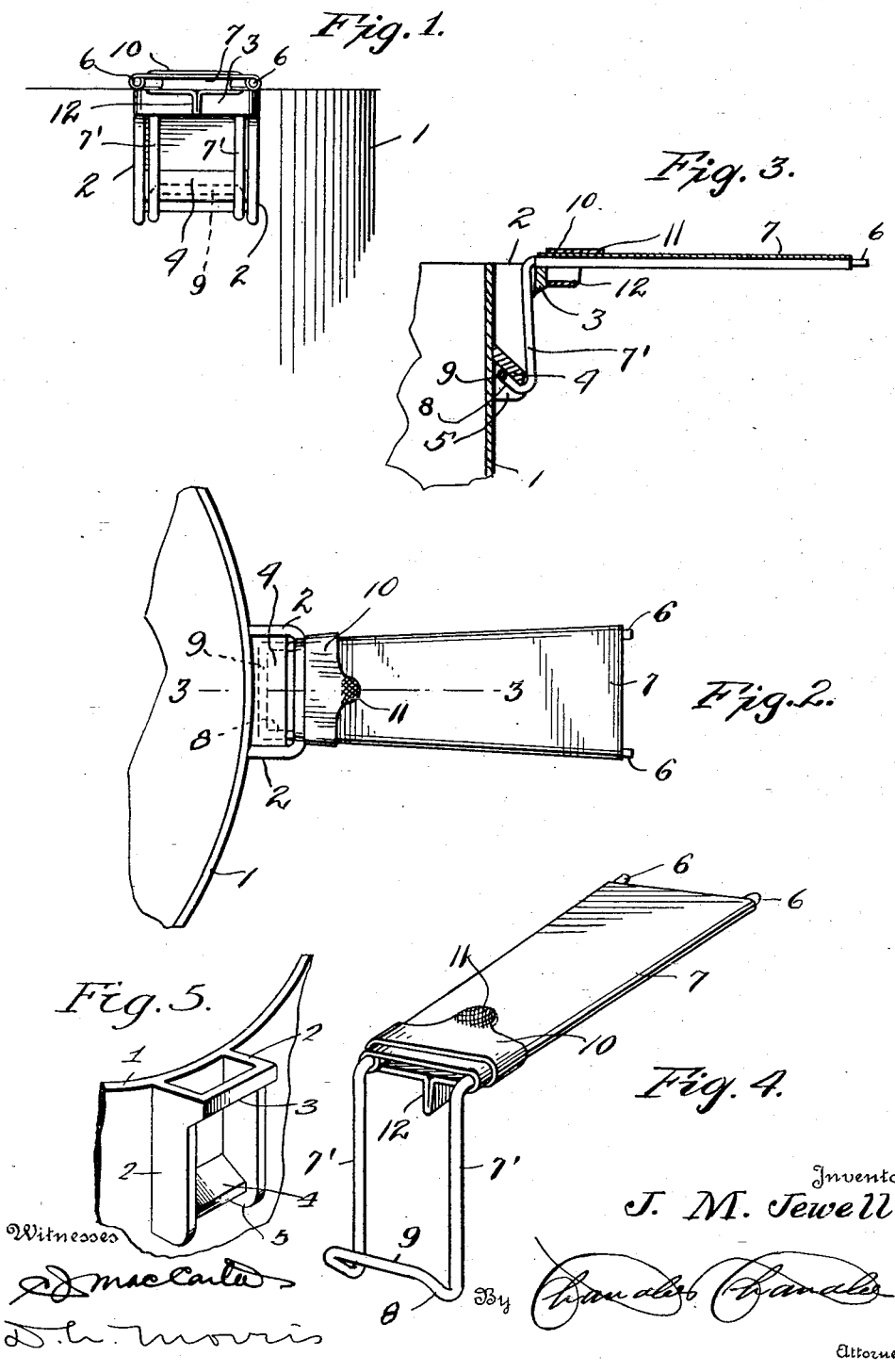

JOHN M. JEWELL, OF NEW YORK, N. Y.

DETACHABLE POT-HANDLE.

1,189,957.  Specification of Letters Patent.  Patented July 4, 1916.

Application filed June 25, 1914.  Serial No. 847,281.

*To all whom it may concern:*

Be it known that I, John M. Jewell, a citizen of the United States, residing at New York, in the county of New York, State of New York, have invented certain new and useful Improvements in Detachable Pot-Handles; and I do hereby declare the following to be a full, clear, and exact description of the invention, such as will enable others skilled in the art to which it appertains to make and use the same.

This invention relates to a detachable pot handle.

An object of the invention is to provide a device of this character which may be readily attached and detached from a pot and which may be quickly locked to the pot so as not to become accidentally detached therefrom.

With this and other objects in view, such as will appear as the description progresses, my invention comprises the combination and arrangement of parts as herein set forth and subsequently claimed.

Referring to the drawing: Figure 1 is a rear elevation of my device. Fig. 2 is a plan view thereof. Fig. 3 is a section on line 3—3 of Fig. 2. Fig. 4 is a perspective view of the handle. Fig. 5 is a fragmentary detail showing the handle supporting means on the receptacle.

Referring to the drawing wherein like parts are indicated by like characters throughout the several views, secured to the pot 1 is a pair of outwardly extending spaced ears 2. Extending transversely between these ears and secured to the outer edges adjacent the upper ends thereof is a cross bar 3 and secured between the ears adjacent the lower ends thereof is an inclined cross bar 4 forming a space 5 between the side of the pot and the said bar.

The handle comprises a wire having two divergent legs 6 between which is secured a web 7 of any suitable material. These legs at their forward ends bend downwardly and are parallel, as at 7', and thence are bent upwardly into hook formation, as at 8, and the ends of these bent portions are connected by a cross bar 9. Mounted on the divergent portion 6 of the wire is a slide 10 having a handle 11 on its upper face and a vertical projection 12 on its lower face.

When the handle is in place on the attachment to the pot the parallel arms extend downwardly between the face of the pot and the cross bar 3 and bear against the inner face of the said cross bar, the hook portions 8 extend up under the cross bar 4 and the connecting bar 9 lies in the space 5 between the face of the pot and the adjacent face of the cross bar 4. The slide 10 is pushed forwardly so that the projection 12 thereon will contact with the rear face of the cross bar 3 and secure the pot against displacement from the handle. When it is desired to lift the handle from the pot, however, it is only necessary to pull the slide 10 rearwardly by use of the knob 11 until the projection 12 on the said slide disengages the cross bar 3. The web 7 may then be tilted upwardly until the curved portions at the upper ends of the parallel portions 7' engage the face of the pot, at which time any further upward movement of the web 7 will cause the hooks 8 to be disengaged from the bar 4 because of the fact that the curved portions will push the hooks downwardly and thence outwardly. The handle may then be readily lifted from the pot.

From the foregoing description it may be seen that I have provided a device which will obviate the possibility of the handle becoming hot and by means of which a pot or pan may be readily lifted from a stove, and I have further provided means for preventing the accidental disengagement of the handle from the pot, and I have still further provided means on the said handle for assisting in the disengaging operation.

What is claimed is:—

1. The combination with a utensil having outwardly extending spaced ears on the side thereof, a cross bar secured to the outer edges of the said ears adjacent the upper ends thereof, and a second cross bar secured between the ears at the lower edges thereof and extended downwardly and outwardly from the utensil, of a handle detachably secured to the said utensil, said handle comprising a web, arms extending downwardly therefrom and hook shaped portions on the lower ends of said arms, the arms being arranged to bear against the inner face of the upper cross bar and the hook shaped portion to engage beneath the lower cross bar, the portions connecting the web of the handle and the arms being curved whereby when the outer end of the handle is lifted it will move about the hook shaped portion as a pivot until the curved portion engages the face of the utensil at which time further movement of the handle will cause the disengagement of the hook shaped portion from the lower cross bar.

2. The combination with a utensil having outwardly extending spaced ears on the side thereof, a cross bar extending between the outer edges at the upper ends thereof, a second cross bar extending between the ears at lower ends thereof, of a handle detachably secured to the said utensil, the said handle including a web, wires for supporting the same arranged to bear against the uppermost cross bar, hook shaped portions engaging beneath the lowermost cross bar, and means for maintaining the handle in its operative position, the web supporting wires being so bent as to bear against the utensil and cause the disengagement of the hook shaped portion from the adjacent cross bar upon the release of the aforementioned means and the raising of the end of the web.

In testimony whereof, I affix my signature in presence of two witnesses.

JOHN M. JEWELL.

Witnesses:
WILLIAM DUGGAN,
WILLIAM GERAGHTY.

Copies of this patent may be obtained for five cents each, by addressing the "Commissioner of Patents, Washington, D. C."